United States Patent Office 3,022,807
Patented Feb. 27, 1962

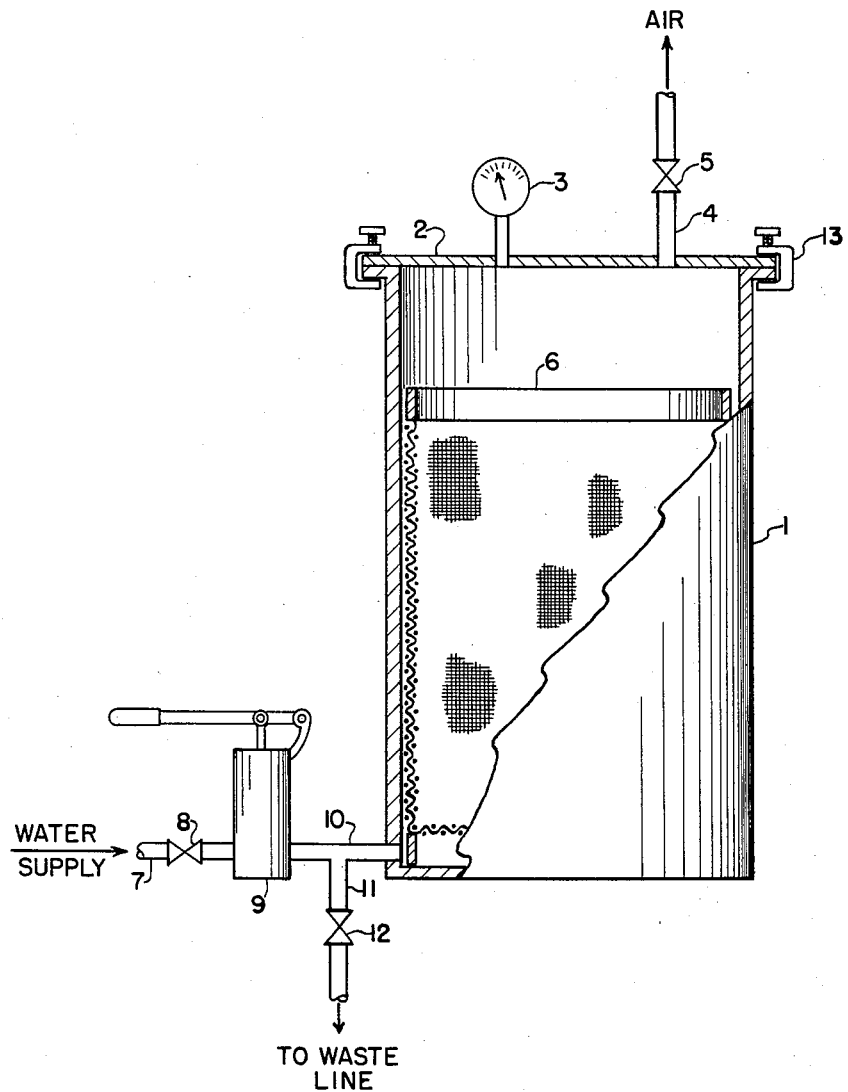

3,022,807
PROCESS FOR INDUCING SHELL SPLITTING IN PISTACHIO NUTS
Felix Bloch, Oakland, Calif., assignor to the United States of America as represented by the Secretary of Agriculture
Filed Nov. 27, 1959, Ser. No. 855,948
3 Claims. (Cl. 146—227)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates in general to the treatment of pistachio nuts. The primary object of the invention is the provision of novel processes for splitting the shells of pistachio nuts. Further objects and advantages of the invention will be evident from the following description wherein parts and percentages are by weight, unless otherwise specified.

The single FIGURE in the annexed drawing is a side view, partly in cross-section, of apparatus with which the process of the invention may be carried out.

Most pistachio nuts are marketed in the shell and reach the consumer salted and roasted in the shell. Because of this marketing practice the condition of the shells—that is, whether they are split or unsplit—is a significant quality factor. This situation is further explained as follows: It is well known in the art to which the invention pertains that orchard-run lots of pistachio nuts are not of uniform grade but contain nuts of varying commercial value. Primarily, any orchard-run lot will be found to contain (a) split nuts and (b) unsplit nuts. Those in the first category are referred to as split nuts because their shells (not the kernels) are partly open along their seams. Botanically, this is described as a splitting of the endocarp into two valves along the keel. To make a simple analogy, the appearance of these nuts may be likened to a partly open clam shell. In the unsplit nuts, the shells are closed. The split nuts are of higher quality as they contain mature, plump, full-sized kernels. Also they are preferred by the consumer as the kernels are easily removed from the shells. That is, since the shells are partly open it is easy to open them further by digital action. The unsplit nuts are of lower quality because their meat content is lower and more variable that that of the split nuts. Moreover, the unsplit nuts are relatively difficult to open so that they are not preferred by the consumer.

In accordance with the invention there is provided a process whereby the shells of unsplit pistachio nuts are caused to split. Thereby the quality of the nuts is enhanced in that they are more readily opened by the consumer. The process of the invention yields split nuts which have the same appearance as naturally split nuts. Thus by the process of the invention the shells split along the keel or seam with a separation along this line of the two halves of the shell. Other than this there is no breaking of the shells. Moreover, the kernels are not injured in any way and remain intact. Another significant point is that when the process of the invention is applied to a lot of unsplit nuts of varying kernel content, the shell splitting which results is largely limited to those nuts which contain kernels of significant size. Those unsplit nuts which have minute or insignificant meat contents are not split by the process. This is a desirable result as it facilitates grading of the product by procedures adapted to differentiate between split and unsplit nuts. An example of such a grading or separating procedure, is described in my copending application, Serial No. 778,038, filed December 3, 1958, now Patent No. 2,976,992, issued March 28, 1961.

The process of the invention is outstanding in its simplicity in that the splitting is attained by merely placing the nuts in a container and subjecting them to water under superatmospheric pressure. Usually a pressure of about 150 pounds per square inch gauge (hereinafter abbreviated as p.s.i.g.) is employed, although in general the pressure may be varied about from 50 to 250 p.s.i.g. The nuts are held under this pressure long enough to cause the desired shell splitting. The time in any case will vary depending on such factors as the pressure used, the variety of nuts, their maturity, etc. In any particular case the proper time for holding the pressure can be readily determined by subjecting pilot samples of nuts to water pressure for different periods of time and noting the appearance of the nuts. In general, the pressure is maintained for about 5 to 180 minutes.

Following the pressure step, the nuts are drained and dried in a current of warm air in conventional manner.

The nuts which are subjected to the pressure treatment may be in-hull or dehulled. If in-hulled nuts are used, they are dehulled after the pressure treatment and before drying. On the other hand, the nuts may be dehulled prior to application of the pressure treatment.

The process is preferably applied to nuts having a moisture content essentially as freshly-harvested, that is, about 25 to 45% water. Such moist nuts display maximum splitting after the treatment of the invention. Where the nuts have been previously dried, they may be remoistened by application of humid air, steam or water prior to application of the pressure treatment.

Various types of equipment may be utilized for carrying out the pressure treatment. A suitable form of apparatus is depicted in FIGURE 1 of the annexed drawing. Referring thereto, vessel 1 is of pressure-resistant construction and is provided with a demountable lid 2 equipped with pressure gauge 3, vent pipe 4, and valve 5. Within vessel 1 is a mesh basket 6 providing the means for holding the nuts to be treated. For filling vessel 1 with water and increasing the water pressure in the vessel there is provided pipe 7 attached to a source of water supply, valve 8, hand pump 9, and pipe 10. Pump 9 is provided with the usual check valves permitting flow only in the direction from the water supply to vessel 1. For emptying the system there is provided pipe 11 equipped with valve 12.

In applying the process of the invention, lid 2 is removed and basket 6 containing the nuts to be treated is placed within vessel 1. Lid 2 is then put in place and fastened securely by use of dogs 13 to make the system pressure tight. Water is then introduced into the system via pipe 7, sufficient water being added to completely fill vessel 1. During the filling operation, valve 5 is opened to permit air to leave the system. When vessel 1 is filled valve 5 is closed and pump 9 is operated to increase the pressure of water in vessel 1 to about 150 p.s.i.g. The system is allowed to stand under this water pressure for about 10 minutes then valve 8 is closed and the pressure released by opening valve 5. Lid 2 is then removed and the treated nuts taken out of the system by lifting out basket 6.

Ordinarily, the pressure treatment in accordance with the invention is carried out with plain water. However one can use water containing any desired food ingredient, for example, flavorings, colorings, preservative agents, etc. As a typical example of such modification one may employ an aqueous solution of salt instead of plain water thus to automatically salt the nuts during the pressure treatment. For such purpose one may use a solution containing, say 1 to 25% salt (NaCl) depending on the flavor desired in the final product.

The invention is further demonstrated by the following illustrative examples.

EXAMPLE I

Three lbs. of freshly-harvested, in-hull pistachio nuts of the Red Aleppo variety were placed in a mesh basket. The basket was inserted in a vessel as depicted in the drawing and the vessel sealed. The vessel was filled with water, removing air from the top of the vessel as described above. When the air was displaced, the pressure of water was raised to 160 p.s.i.g. The vessel was vented once more to evacuate entrapped air; then the water pressure was held at 140 to 160 p.s.i.g. for a period of 45 minutes. After this period, the nuts were removed, dehulled in an abrasive peeler and dried to a moisture content of 6% by spreading them on trays and exposing them to a draft of air at 102° F. for about 18 hours.

EXAMPLE II

Freshly-harvested pistachio nuts from the same lot as in Example I were dehulled in an abrasive peeler. The dehulled nuts were then subjected to the same pressure treatment as described in Example I followed by drying also as described in Example I.

EXAMPLE III

The process of Example I was repeated using nuts of the same lot but in this case the nuts were held under water pressure for three hours. The treated nuts were dehulled and dried as in Example I.

EXAMPLE IV (CONTROL)

As a control, two portions of the freshly harvested nuts of the same lot as above were dehulled and dried as described in Example I.

*Results*

The four products were each manually separated into split and unsplit nuts and these fractions were weighed to determine their proportions. The following results were found: The product of Example I contained 43% less unsplit nuts than the average of the two control products (IV). The products of Examples II and III contained 36% and 35%, respectively, less unsplit nuts than the average of the control products (IV).

As an additional test, the unsplit nuts manually separated from the four products were opened and their meat content determined. It was found that in the unsplit nuts of the control products, about 70% had developed kernels whereas in the unsplit nuts of the products of Examples I, II and III, about 35 to 45% had developed kernels. This indicates that the pressurizing process resulted in splitting mainly those unsplit nuts which contained developed kernels.

EXAMPLE V (A) A lot of freshly-harvested pistachio nuts was subjected to the water pressure treatment as described in Example I except that in this case the water pressure (150 p.s.i.g.) was held for only 10 minutes. These nuts were then dehulled and dried as in Example I.

(B) For comparison purposes, a sample of the same nuts was soaked in water, at atmospheric pressure, for 30 minutes, then dehulled and dried as in Example I.

(C) As a control, a sample of the same nuts was dehulled and dried without any water treatment.

It was found that product A contained 34% less unsplit nuts than the control product (C). Product B contained the same proportion of unsplit nuts as the control product (C).

The process of the invention may be applied to lots of pistachio nuts containing split nuts as well as unsplit nuts since the split nuts are not harmed in any way by the treatment. If desired, however, the nuts may be first fractionated to separate the split nuts from the unsplit nuts and the process applied to the latter fraction. Also, products of the present process, directly or after drying, may be fractionated to separate the split and unsplit nuts. These fractionations are preferably carried out in the manner described in my aforesaid Patent No. 2,976,992, issued March 28, 1961.

Having thus described my invention, I claim:

1. A process for splitting the shells of closed-shell pistachio nuts which comprises contacting the said nuts with water under a superatmospheric pressure in the range from about 50 to 250 pounds per square inch gauge pressure for a time long enough to cause splitting of the shells, said time being within the range from about 5 to about 180 minutes.

2. A process for splitting the shells of closed-shell pistachio nuts which comprises contacting the said nuts with water under a superatmospheric pressure in the range from about 50 to 250 pounds per square inch gauge pressure for a time long enough to cause splitting of the shells, said time being within the range from about 5 to about 180 minutes, and drying the treated nuts in a current of warm air.

3. The process of claim 2 wherein the said closed-shell pistachio nuts have a moisture content from 25 to 45% prior to the pressure treatment.

References Cited in the file of this patent

UNITED STATES PATENTS

| | | |
|---|---|---|
| 2,318,265 | Stagmeier | May 4, 1943 |
| 2,629,418 | Smith | Feb. 24, 1953 |